US008724124B2

(12) United States Patent
Ohtsuka et al.

(10) Patent No.: US 8,724,124 B2
(45) Date of Patent: May 13, 2014

(54) IMAGE FORMING APPARATUS, IMAGE FORMING SYSTEM, AND COMPUTER-READABLE RECORDING MEDIUM HAVING PROGRAM

(75) Inventors: Masaru Ohtsuka, Tokyo (JP); Susumu Kurihara, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 29 days.

(21) Appl. No.: 13/552,363

(22) Filed: Jul. 18, 2012

(65) Prior Publication Data

US 2013/0021650 A1 Jan. 24, 2013

(30) Foreign Application Priority Data

Jul. 21, 2011 (JP) ................................ 2011-160140

(51) Int. Cl.

*G06F 15/00* (2006.01)
*G06F 3/12* (2006.01)
*G06K 1/00* (2006.01)

(52) U.S. Cl.

USPC ........... 358/1.1; 358/1.13; 358/1.9; 358/1.15; 358/1.16

(58) Field of Classification Search

None
See application file for complete search history.

(56) References Cited

FOREIGN PATENT DOCUMENTS

| | | |
|---|---|---|
| JP | 02-262163 | 10/1990 |
| JP | 06-195503 | 7/1994 |
| JP | 2007-189315 | 7/2007 |
| JP | 2007-331322 | 12/2007 |
| JP | 2009-248319 | 10/2009 |

OTHER PUBLICATIONS

Notification of Reasons for Refusal issued by Japanese Patent Office on Oct. 16, 2013, in corresponding Application No. JP 2011-160140 (2 pages).
English-language translation of Notification of Reasons for Refusal issued by Japanese Patent Office on Oct. 16, 2013, in corresponding Application No. JP 2011-160140 (2 pages).

*Primary Examiner* — Thierry L Pham
(74) *Attorney, Agent, or Firm* — Holtz, Holtz, Goodman & Chick PC

(57) ABSTRACT

An image forming apparatus that sets an output unit configured by a plurality of pages of which the order is determined as one copy and outputs the a plurality of copies of output units as a JOB includes an image forming unit that sequentially forms images corresponding to the plurality of pages on a plurality of sheets, a control unit that performs a calculation process of image eigenvalues based on the images for each of output units, a first storage unit storing a result of the calculation process performed for a reference copy of the output unit that is a specific one copy out of the plurality of copies of the output units, and a second storage unit storing a result of the calculation process performed for a copy of the output unit other than the reference copy out of the plurality of copies of the output units.

20 Claims, 9 Drawing Sheets

IMAGE FORMING APPARATUS, IMAGE FORMING SYSTEM, AND COMPUTER-READABLE RECORDING MEDIUM HAVING PROGRAM

BACKGROUND OF THE INVENTION

1. Field of the Invention

The present invention relates to an image forming apparatus that sets an output unit configured by a plurality of pages of which the order is determined as one copy and is capable of outputting a plurality of copies of output units, an image forming system that includes the image forming apparatus, and a computer-readable recording medium having a program.

2. Description of the Related Art

Conventionally, image forming apparatuses are known, each forms an image on a sheet based on image data and discharges the sheet on which the image is formed. The image forming apparatuses, for example, are a copying machine, a printer, a facsimile, a multifunction periphery, and the like. In the case where the image forming apparatus is a copying machine, the image forming apparatus acquires image data by reading an image from a document. On the other hand, in the case where the image forming apparatus is a printer, the image forming apparatus acquires image data from an external apparatus such as a personal computer.

As a method of using the image forming apparatus, there may be a case where the image forming apparatus outputs an output unit that is configured by a plurality of pages. In such a case, a checking operation is important to check whether or not a image is normally formed on a sheet. For example, in the checking operation, it is checked whether or not page missing, paging disorder, or the like occurs.

Here, in the case where a plurality of copies of output units are output, especially in production-based printing in which printing is performed on a massive scale, for manually checking page missing and paging disorder for an output material after output, a large quantity of processes is required. If an output material in which page missing or paging disorder occurs is delivered to a client, it results in a remarkable credit loss for the client.

Accordingly, it is preferable to automate the checking operation, and techniques for detecting page missing at the time of performing a printing operation are proposed in Patent Literature 1, 2 and the like.

In Patent Literature 1, an image forming apparatus is proposed in which identification information corresponding to each one of a plurality of pages is assigned to page data, and, by performing a calculation process that is based on the reading sequence of the page data, it is determined whether or not an image is normally formed on a plurality of sheets for output units other than the n-th copy by comparing a calculation processing result of the n-th copy and a calculation processing result of copies other than the n-th copy. More specifically, in the case where the calculation processing result of copies other than the n-th copy coincides with that of the n-th copy, it is determined that page missing, paging disorder, or the like has not occurred in the output units other than the n-th copy. On the other hand, in the case where the calculation processing results do not coincide with each other, it is determined that page missing, paging disorder, or the like has occurred, abnormality processing is performed, and the output process is stopped.

In Patent Literature 2, a technique (hereinafter, referred to as a first technique) is proposed in which a sum value of the numbers of pixels of a plurality of pages that configures the output n-th copy of unit and a sum value of the numbers of pixels of a plurality of pages that configure the (n+1)-th copy or after the (n+1)-th copy of output units are compared with each other. More specifically, in the case where sum values of the numbers of pixels coincide with each other, the image forming apparatus determines that page missing, paging disorder, or the like has not occurred in the (n+1)-th copy or after (n+1)-th copy of output unit. On the other hand, in the case where the sum values of the numbers of pixels do not coincide with each other, the image forming apparatus determines that page missing, paging disorder, or the like has occurred in the (n+1)-th copy or after the (n+1)-th of copy, performs abnormality processing, and stops the output process.

CITATION LIST

Patent Literature

Patent Literature 1: Japanese Patent Application Laid-Open No. 2009-248319

Patent Literature 2: Japanese Patent Application Laid-Open No. 2007-189315

As described above, according to the related techniques, the output process is stopped at the time of detecting the abnormality such as page missing or paging disorder, and an operator's checking operation is expected. Meanwhile, in a segment in which a large quantity of outputs is performed, the apparatus operating ratio is directly linked to a profit, and accordingly, it should be avoided to decrease the operating ratio due to stopping of the apparatus as possible. For example, in the case of performing an operation at night or in the case where one operator manages and operates a plurality of image forming apparatuses, there is a possibility that, when an apparatus is stopped, the apparatus is stopped for a long time. As a result, a time is consumed until the output process is restarted, and the operating time of the image forming apparatus is decreased so as to decrease the productivity, whereby there is a possibility of incurring a delivery delay.

Meanwhile, after the page missing or the paging disorder occurs once, there is a small number of cases in which the output process is continued in a constant state of the page missing or the paging disorder, but there is a large number of cases in which separation during a conveyance operation for sheet overlapping conveyance, a slip at the time of reversing a sheet, or the like partly occurs.

Accordingly, even in the case where an abnormality occurs, a normal state may be recovered for the next unit and the subsequent units, and in many cases, the output process can be continued.

The present invention is devised based on the above-described situations as a background, and provides an image forming apparatus, an image forming system, and a computer-readable recording medium having a program that can automatically detect an abnormality such as page missing or paging disorder and can increase the operating ratio by continuing the output process even at the time of detecting the abnormality.

SUMMARY OF THE INVENTION

To achieve at least one of the abovementioned objects, an image forming apparatus that sets an output unit configured by a plurality of pages of which the order is determined as one copy and outputs a plurality of copies of the output units as a JOB comprises: an image forming unit that sequentially forms images corresponding to the plurality of pages on a plurality of sheets; a control unit that performs a calculation process of image eigenvalues that are based on the images for each of the output units; a first storage unit that stores a result of the calculation process performed for a reference copy of the output unit that is a specific one copy out of the plurality of the copies of the output units; and a second storage unit that stores a result of the calculation process performed for a copy of the output unit other than the reference copy of the output unit out of the plurality of the copies of the output units, wherein the control unit determines whether or not images are normally formed on the plurality of sheets for the copy of the output unit other than the reference copy of the output unit based on a result of comparison between the result of the calculation process which is stored in the first storage unit and the result of the calculation process which is stored in the second storage unit and, in the case where a negative determination is made, stores a place determined to be negative, and continues to output the JOB without stop.

In the above-described image forming apparatus, it is preferred that the image forming apparatus further include a third storage unit that stores the place determined to be negative.

In the above-described image forming apparatus, it is preferred that the image forming apparatus further include an eigenvalue calculating unit that calculates the image eigenvalues of the images when the images are formed or before the images are formed.

In the above-described image forming apparatus, it is preferred that the control unit perform the calculation process depending on the order of the image eigenvalues.

In the above-described image forming apparatus, it is preferred that the image forming apparatus further include an image data storing unit that stores data of images corresponding to the plurality of pages, in which the control unit repeatedly reads out the image data corresponding to the number of copies, which is designated, from the image data storing unit when the plurality of copies is output.

In the above-described image forming apparatus, it is preferred that the image forming apparatus further comprises: a printer controller unit that receives data for an image from the outside and processes the data into image data for printing, wherein the eigenvalue calculating unit calculates the image eigenvalues based on the image data of each page that is transmitted from the printer controller unit.

In the above-described image forming apparatus, it is preferred that the control unit perform an abnormality notifying process in the case where the negative determination is made through the determination.

In the above-described image forming apparatus, it is preferred that the control unit notifies the place that is determined to be negative in the abnormal notifying process.

In the above-described image forming apparatus, it is preferred that the control unit stop the output of the JOB in the case where the negative determination is consecutive for a predetermined number of copies.

In the above-described image forming apparatus, in the case where the negative determination is made through the determination, it is preferred that the control unit determine whether or not the output of the JOB is continued in accordance with a predetermined condition and continue or stop the output of the JOB based on a result of the determination.

In the above-described image forming apparatus, it is preferred that the predetermined condition is whether or not an operator is detected within a predetermined distance from the image forming apparatus.

In the above-described image forming apparatus, it is preferred that the predetermined condition is whether or not a predetermined time has elapsed after an operation or running of the image forming apparatus.

In the above-described image forming apparatus, it is preferred that the predetermined condition is whether or not a sequence number of a copy for which an image is determined to have not normally been formed is a predetermined sequence number of a copy.

In the above-described image forming apparatus, it is preferred that the predetermined condition is whether or not copies for which an image is determined to have not normally been formed are consecutive for a predetermined number of copies.

In the above-described image forming apparatus, it is preferred that the predetermined condition is whether or not the current time is a predetermined time.

In the above-described image forming apparatus, it is preferred that the image forming apparatus further include an operation unit that receives an operation input, in which the control unit is capable of setting the reference copy through the operation unit.

To achieve at least one of the abovementioned objects, an image forming system comprises; an image forming apparatus that sets an output unit configured by a plurality of pages of which the order is determined as one copy, outputs a plurality of copies of output units as a JOB, and includes an image forming unit that sequentially forms images corresponding to the plurality of pages on a plurality of sheets; an external apparatus that is capable of transmitting images corresponding to the plurality of pages of which the order is determined; a network to which the image forming apparatus and the external apparatus are connected; and an eigenvalue calculating unit that calculates image eigenvalues of the images, wherein the image forming apparatus further includes; a control unit that performs a calculation process of the image eigenvalues for each of the output units; a first storage unit that stores a result of the calculation process performed for a reference copy of the output unit that is a specific one copy out of the plurality of copies of output units; and a second storage unit that stores a result of the calculation process performed for a copy of output unit other than the reference copy of the output unit out of the plurality of copies of output units, and wherein the control unit determines whether or not images are normally formed on the plurality of sheets for the copy of the output unit other than the of the output unit based on a result of comparison between the result of the calculation process which is stored in the first storage unit and the result of the calculation process which is stored in the second storage unit and, in the case where a negative determination is made, stores a place determined to be negative, and continues to output the JOB without stop.

In the above-described image forming system, it is preferred that the eigenvalue calculating unit is included in the external apparatus or the image forming apparatus.

To achieve at least one of the abovementioned objects, a computer-readable recording medium in which a program is stored that causes a computer for controlling an image forming apparatus to perform a function of setting an output unit configured by a plurality of pages of which the order is determined as one copy and outputting a plurality of copies of output units, the program implements: a function of sequentially forming images corresponding to the plurality of pages on a plurality of sheets; a function of performing a calculation process of image eigenvalues that are calculated based on the images for each of the output units; a function of storing a result of the calculation process performed for a reference copy of the output unit that is a specific one copy out of the plurality of copies of the output units in a first storage unit; a function of storing a result of the calculation process performed for the copy of output unit other than the reference copy of the output unit out of the plurality of copies of the output units in a second storage unit; and a function of determining whether or not images are normally formed on the plurality of sheets for a copy of the output unit other than the reference copy of the output unit based on a result of comparison between the result of the calculation process, which is stored in the first storage unit, and the result of the calculation process, which is stored in the second storage unit and, in the case where a negative determination is made, storing a place determined to be negative, and continues to output the JOB without stop.

In the above-described computer-readable recording medium, it is preferred that the program further implementing a function of calculating the image eigenvalues of the images when the images are formed or before the images are formed is stored.

DESCRIPTION OF THE EMBODIMENTS

Hereinafter, an embodiment of the present invention will be described.

Figure 1:
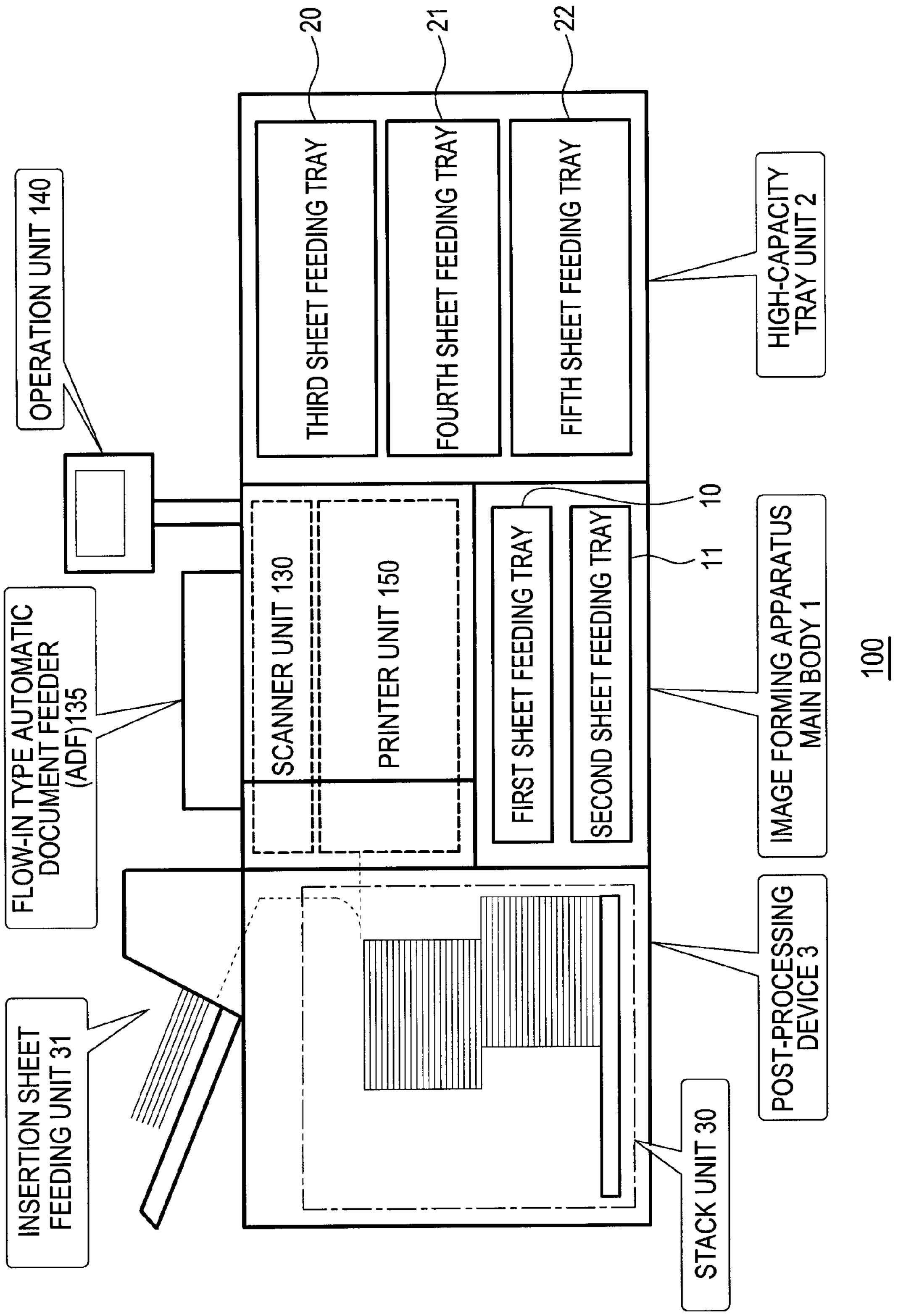
FIG. 1 is a schematic diagram that illustrates an image forming apparatus according to an embodiment of the present invention.

An image forming apparatus 100, as illustrated in FIG. 1, includes an image forming apparatus main body 1 and a large-capacity tray unit 2 and a post-processing device 3 that are attached thereto.

The large-capacity tray unit 2 includes a third sheet feeding tray 20, a fourth sheet feeding tray 21, and a fifth sheet feeding tray 22 and can feed a sheet from each sheet feeding tray to the image forming apparatus main body 1.

The image forming apparatus main body 1 includes a first sheet feeding tray 10 and a second sheet feeding tray 11 in a lower part and can selectively use the first sheet feeding tray 10, the second sheet feeding tray 11, or the large-capacity tray unit 2.

In the image forming apparatus main body 1, a printer unit 150 that performs printing for a sheet fed from each sheet feeding tray and a scanner unit 130 that reads in an image from a document are included, and an automatic document feeder (ADF) 135 of a flow-in type that automatically feeds a document to the scanner unit 130 is included in an upper part of the image forming apparatus main body 1. In addition, in an upper part of the image forming apparatus main body 1, an operation unit 140 that receives an operation input from an operator and can display information is included. The operation unit 140 can be configured by a touch panel in which an operation part and a display part are integrated together or the like, and the operation part and the display part may be configured as separate bodies.

The post-processing device 3 includes a stack unit 30 that stacks sheets that are printed and output by the image forming apparatus main body 1 and an insertion sheet feeding unit 31 that feeds an insertion sheet to be inserted into printed sheets.

Figure 2:
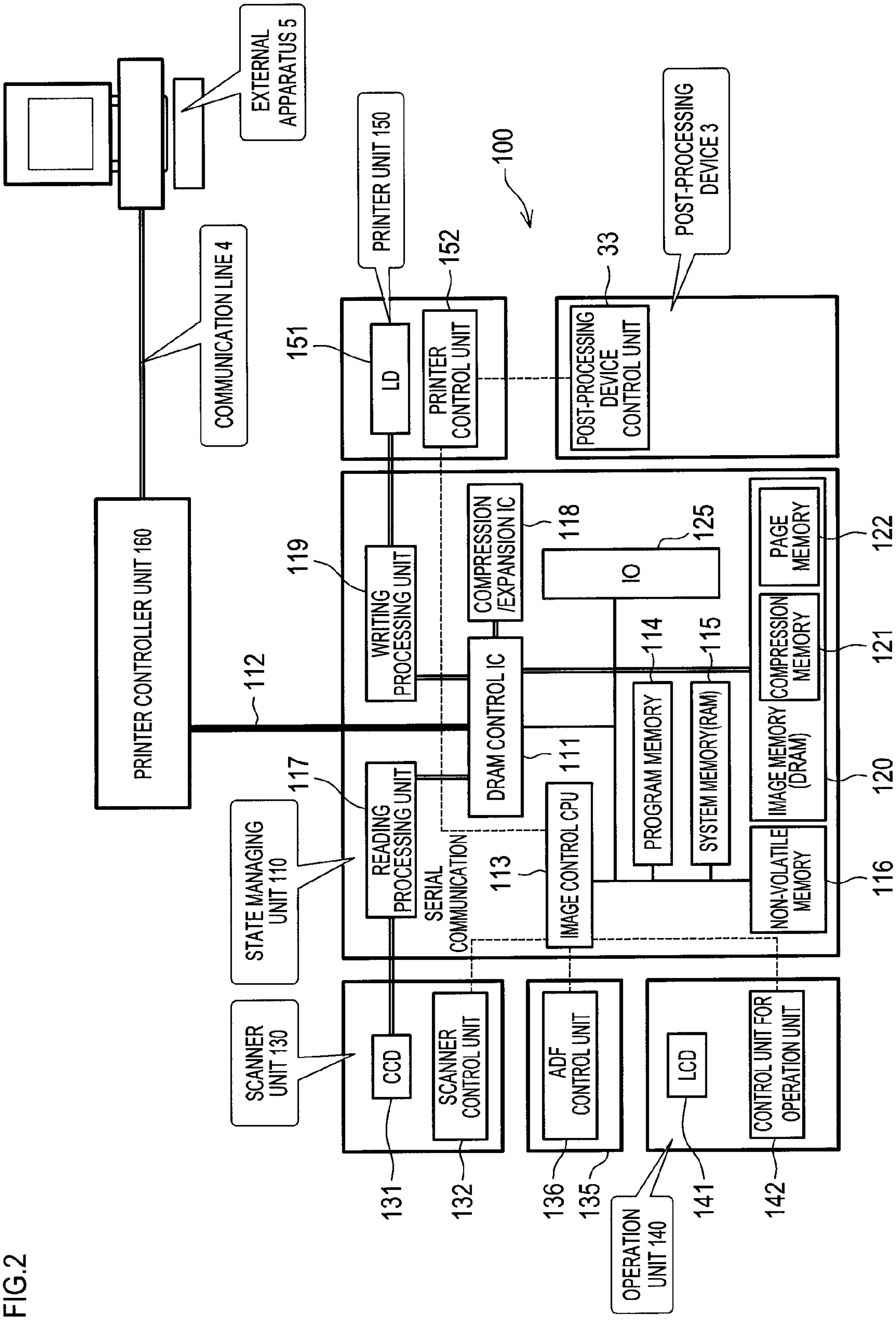
FIG. 2 is a diagram that illustrates control blocks.

Next, the function of the image forming apparatus 100 will be described with reference to a control block diagram illustrated in FIG. 2.

The image forming apparatus 100 includes a state managing unit 110, the scanner unit 130, the operation unit 140, and the printer unit 150 and further includes a printer controller unit 160 that processes image data input from an external apparatus 5 such as a PC through a communication line 4 such as a LAN or allows image data acquired from the scanner unit 130 to be transmittable to the external apparatus 5 through the communication line 4.

The external apparatus 5 is configured by a personal computer, a server, or the like in which a printer driver or application software is mounted.

The image forming apparatus 100, the communication line 4, and the external apparatus 5 configure an image forming system according to an embodiment of the present invention.

The state managing unit 110 includes a PCI bus 112 that is connected to the printer controller unit 160, and a DRAM control IC 111 is connected to the PCI bus 112. An image memory, 120 is connected to the DRAM control IC 111. The image memory 120 includes a compression memory 121 and a page memory 122. The compression memory 121 is a memory that is used for storing compressed image data, and the page memory 121 is a memory that is used for temporarily storing uncompressed image data as a printing target before formation of an image. The image memory 120 corresponds to an image data storing unit according to an embodiment of the present invention.

The image data that is acquired by the printer controller unit 160 is transmitted to the DRAM control IC 111 through the PCI bus 112 in accordance with a printing operation.

In addition, the state managing unit 110 includes an image control CPU 113, and the DRAM control IC 111 is connected to the image control CPU 113.

In addition, to the image control CPU 113, a program memory 114 that is configured by a non-volatile memory such as a ROM and has a program stored therein; a system memory 115 that is configured by a RAM and is used for a work area or temporarily storing data, and a non-volatile memory 116 that is configured by a flash memory or the like are connected. In the non-volatile memory 116, apparatus setting information such as initial print setting information of the image forming apparatus 100 or process control parameters, a calculation equation that is used for calculating an image eigenvalue, and the like are stored in a readable state.

The image eigenvalue can be acquired by using various methods. For example, a technique using a CRC 32 code, a checksum, a printing rate, or the like of image data can be used, and such a technique is not particularly limited in an embodiment of the present invention.

An eigenvalue calculating unit that calculates an image eigenvalue based on an image may be separately provided from a control unit or may be additionally served by the control unit. In addition, it may be configured such that the image eigenvalue is not calculated in the image forming apparatus, but an image eigenvalue calculated by an external apparatus that is connected to a network is acquired and is used for a calculation. The eigenvalue calculating unit may perform the calculation based on the whole image or may perform the calculation while a part of the image is excluded.

The image control CPU 113 can read data that is stored in the program memory 114, the system memory 115, and the non-volatile memory 116 and can write desired data into the system memory 115 and the non-volatile memory 116.

The image control CPU 113 controls the operation of each unit of the image forming apparatus 100 based on the apparatus setting information, the print setting information, and the like. Accordingly, the image control CPU 113 corresponds to a computer that controls the image forming apparatus 100.

Next, the scanner unit 130 includes a CCD 131 that performs optical reading and a scanner control unit 132 that controls the overall operation of the scanner unit 130. The scanner control unit 132 is connected to the image control CPU 113 in a serially communicable manner. In addition, the CCD 131 is connected to a reading processing unit 117 that processes image data read out by the CCD 131, and the reading processing unit 117 is connected to the DRAM control IC 111 in a controllable manner. Furthermore, the automatic document feeder (ADF) 135 of the flow-in type includes an ADF control unit 136 that controls the overall operation of the automatic document feeder (ADF) 135 of the flow-in type. The ADF control unit 136 is connected to the image control CPU 113 in a serially communicable manner.

The operation unit 140, also serving as a display unit, includes an LCD 141 that is configured by a touch panel and an control unit for operation unit 142 that controls the overall operation of the operation unit 140, and the control unit for operation unit 142 is connected to the image control CPU 113 in a serially communicable manner. When page missing or paging disorder is detected, by the LCD 141 in the operation unit 140, a predetermined condition can be set, that is used for determining to continue or stop the output under the control of the image control CPU 113.

In addition, a compression/expansion IC 118 that compresses image data or expands compressed image data is connected to the DRAM control IC 111. Furthermore, a writing processing unit 119 is connected to the DRAM control IC 111.

The writing processing unit 119 is connected to the printer unit 150 and processes write data that is used for the operation of an LD unit 151. The printer unit 150 includes an image forming unit that is configured by the LD unit 151 and the like and a sheet conveying mechanism. In addition, the image forming unit further includes a photosensitive body, a transfer unit, a fixing unit, and the like that are not illustrated in the figure.

The printer unit 150 includes a printer control unit 152 that controls the overall operation (sheet feeding, image formation, sheet discharging, post-processing, and the like) of the printer unit 150, and the printer control unit 152 is connected to the image control CPU 113. The printer control unit 152 is operated in accordance with a control instruction by the image control CPU 113, thereby controlling the printer unit 150. A post-processing device control unit 33 that controls the overall operation of the post-processing device 3 is connected to the printer control unit 152, and the post-processing device 3 is controlled through the printer control unit 152. In the post-processing device 3, desired post-processing such as stapling or punching is performed for a sheet that is discharged from the image forming apparatus main body 1.

The printer controller unit 160 is connected to the PCI bus 112 to which the DRAM control IC 111 is connected. In the case where the image forming apparatus 100 is used as a network printer or a network scanner, the printer controller unit 160 receives image data or the like from the external apparatus 5 that is connected to the communication line 4 or the like or transmits the image data acquired from the scanner unit 130 to the external apparatus 5 that is connected to the communication line 4 or the like. In the printer controller unit 160, an image memory (not illustrated in the figure) that is configured by a DRAM or the like is connected to the DRAM control IC 111. In addition, in the printer controller unit 160, a controller control CPU, a communication line interface, and the like are connected to a common bus. The communication line interface is connected to the communication line 4.

In addition, an IO 125 is connected to the image control CPU 113. The IO 125 is operated as an interface that receives or transmits information from or to each unit arranged inside the image forming apparatus 100.

Next, a basic operation of the image forming system will be described. First, the sequence of storing image data in the image forming apparatus 100 will be described.

A case will be described in which image data is generated by reading an image using the scanner unit 130 in the image forming apparatus 100. In the scanner unit 130, an image is optically read from a document by the CCD 131. At this time, the operation of the CCD 131 is controlled by the scanner control unit 132 that receives an instruction from the image control CPU 113. The reading of a document may be performed while the document is fed by the automatic document feeder (ADF) 135 of the flow-in type or may be performed while the document is placed on platen glass.

The image control CPU 113 is operated based on a program and issues an instruction to the scanner unit 130 based on an operation performed on the operation unit 140. After the image read by the CCD 131 is data-processed by the reading processing unit 117 and is transmitted to the DRAM control IC 111, then the image is compressed by the compression/expansion IC 118 and is stored in the compression memory 121 through the DRAM control IC 111.

In addition, image data can be input to the image forming apparatus 100 from the external apparatus 5 through the communication line 4. As examples of the image data include image data that is generated by application software in the external apparatus 5 or the like and image data that is generated by another image forming apparatus. The data is received through the communication line 4 and the printer controller unit 160, is compressed by the compression/expansion IC 118 through the DRAM control IC 111, and then is stored in the compression memory 121 through the DRAM control IC 111.

Furthermore, in the case where an output is performed by the image forming apparatus 100, the data that is stored in the compression memory 121 is sent out to the compression/expansion IC 118 through the DRAM control IC 111 so as to be expanded and is sent out to the writing processing unit 119 so as to generate write data, and the write data is written into the LD unit 151. At this time, in order to output a plurality of copies, the image control CPU 113 performs control for repeatedly reading out the image data corresponding to a designated number of copies from the compression memory 121.

In the printer unit 150, the printer control unit 152 that receives an instruction from the image control CPU 113 controls each unit for feeding a sheet from each sheet feeding tray, conveying a sheet through the conveying mechanism and the like. In the printer unit 150, formation of an image, transfer of the image to a sheet, fixing, and sheet discharging are further performed, and the sheet is discharged to the post-processing device 3. In the post-processing device 3, a control process is performed by the post-processing device control unit 33 that receives an instruction from the printer control unit 152, post-processing corresponding to the content of the instruction is performed, and sheet discharging is performed. On the other hand, in the case where there is no instruction for post-processing, the sheet is discharged without performing post-processing.

In the image forming system, for each image at the time of forming the image or before formation of the image, eigenvalue can be calculated for the whole image or an image acquired by excluding a part of the image. The calculation process can be performed by the writing processing unit 119 of the image forming apparatus 100. In such a case, the writing processing unit 119 configures a part of the computer that controls the image forming apparatus 100. In addition, in the case where the calculation process can be performed by application software, the calculation process can be performed by the external apparatus 5.

In this embodiment, the image eigenvalue of a write image is calculated by the writing processing unit 119 at the time of forming the image. Calculation target information can be set based on designation made by an image input source (printer controller unit 160) or can be set by the operation unit 140 included in the image forming apparatus 100 or the like.

The writing processing unit 119 serves as an eigenvalue calculating unit according to an embodiment of the present invention. The calculated image eigenvalues are sequentially stored in the system memory 115.

In addition, according to an embodiment of the present invention, a CRC 32 code calculating process can be sequentially performed for the image data. At this time, the calculating process may be performed depending on the reading order. This process is performed by the image control CPU 113. The CRC 32 code calculating process corresponds to a calculation process according to an embodiment of the present invention. Accordingly, the image control CPU 113 serves as a control unit according to an embodiment of the present invention.

In the above-described CRC 32 code calculating process, in the case where an image is formed, and the sheet is discharged, the CRC 32 code calculating process is performed for information included in the image data relating to the sheet, and the result is stored in the system memory 115. This process is repeated until the final sheet of the copy is discharged.

In the calculating process, the image eigenvalues that are stored in the system memory 115 are read out, the calculating process is performed for the image eigenvalues by the image control CPU 113, and the result of the calculating process is stored in the system memory 115. In the calculating process, a calculation equation and the like are stored in the non-volatile memory 116, and the stored calculation equation and the like are read out for the calculating process.

By performing the calculating process based on the order of the image eigenvalues, it can be determined whether or not an image is normally formed in units of pages for each copy, and, through this, paging disorder, in which the page order is disordered, other than the page missing can be detected as well. In addition, it can be determined whether or not an image is normally formed in units of copies instead of units of pages. As an example of such a determination, a checksum of the all the copies may be performed. In detection that is performed in units of copies such as a checksum, the same eigenvalue is acquired even in the case where the page order is changed, and paging disorder can not be detected, but page missing can be detected, and thus this form belongs to an embodiment of the present invention.

The result of the CRC 32 code calculating process that is calculated when the final sheet of the first copy out of a plurality of copies is discharged can be stored in the system memory 115 as a reference value in distinction with the results of the other calculating processes.

Accordingly, the system memory 115 that stores the calculation data of the first copy corresponds to a first storage unit.

For the calculation data of the second copy and the subsequent copies, similarly to the first copy, the calculation results of the CRC 32 code calculating process are stored as comparison data in an area of the system memory 115 that is different from that of the calculation data of the first copy. In such a case, the system memory 115 corresponds to a second storage unit that stores a calculating process result of the n-th copy.

In addition, according to as an embodiment of the present invention, a copy to be set as the reference copy is not limited to the above-described first copy.

Regarding the reference copy, for example, a copy that is output for checking may be set as the reference copy, the first copy may be set as the reference copy, or a former copy of two consecutive copies may be set as the reference copy. Thus, the reference copy according to an embodiment of the present invention is not limited to a specific copy.

The image control CPU 113 reads out the calculation data of the first copy, which is stored in the system memory 115 corresponding to the first storage unit, reads out the calculation data of the second copy and the subsequent copies, which is stored in the system memory 115 corresponding to the second storage unit, and checks whether or not outputs other than the reference copy of the output are normal outputs by comparing the CRC codes of the calculation data of both copies.

In the case where the comparison result indicates no coincidence, the image control CPU 113 stores places that are determined not to be coincident in an area of the system memory 115 that is different from the area of the above-described calculation data. In such a case, the system memory 115 corresponds to a third storage unit.

In addition, the image control CPU 113 can continue the output operation even in the case of the above-described non-coincidence. In other words, in the case where the calculation data is determined not to coincide with each other as the comparison result, the image control CPU 113 issues an instruction to the printer control unit 152 and the control unit for the post-processing device 33, as is normal, performs a new sheet feeding operation, and performs image formation within the image forming apparatus main body 1 and post-processing that is necessary within the post-processing device 3.

Furthermore, in the case of the non-coincidence, an abnormality notifying process may be performed. In other words, the operation unit 140 may notify an operator of the abnormality by displaying the occurrence of the non-coincidence, a place at which the non-coincidence occurs, or the like under the control of the image control CPU 113.

The abnormality notification may be performed through a display in the display unit that is included in the image forming apparatus or may be performed through a sound or a speech, or an external apparatus may be notified of the abnormality through a network.

In addition, in the case of the non-coincidence, it can be determined whether or not the output is continued based on a predetermined condition. In such a case, information of the predetermined condition is stored in the non-volatile memory 116 and is read out by the image control CPU 113. The image control CPU 113 that has read out the information of the predetermined condition determines whether or not the predetermined condition is satisfied, determines whether the output will be continued or stopped based on the condition, and controls an image output and the like based on the determination result.

Figure 3:
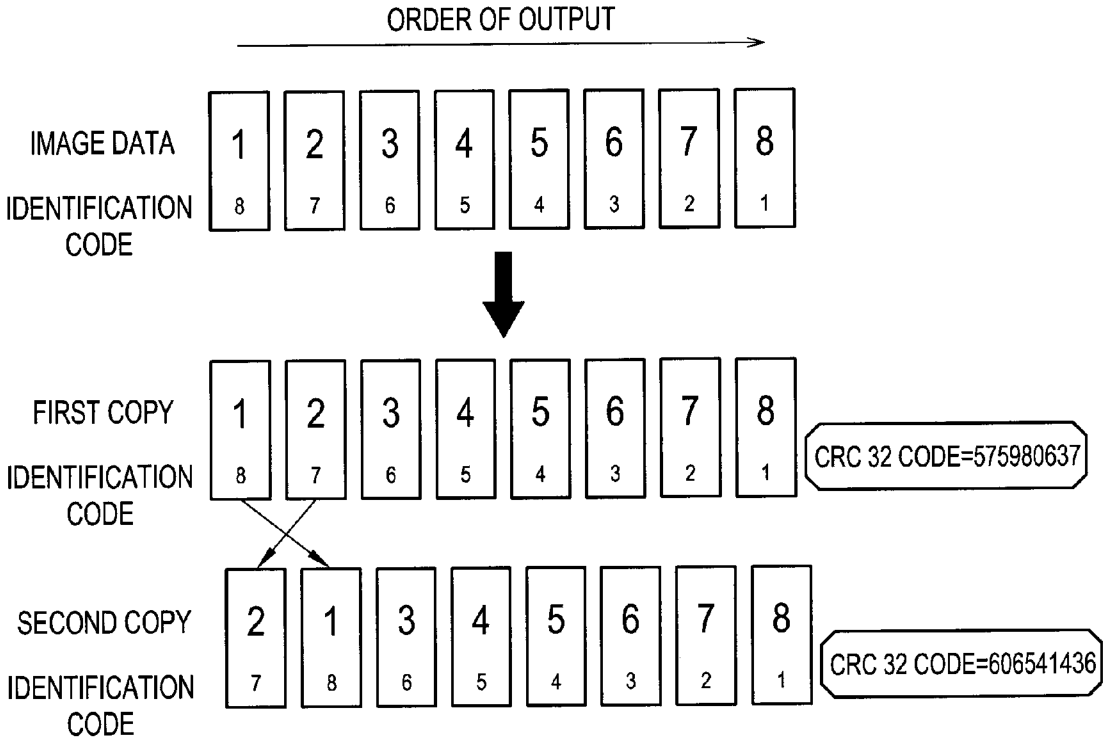
FIG. 3 is a diagram that illustrates an example of a CRC code calculating process in units of copies.

FIG. 3 illustrates an example of the CRC 32 code calculating process in units of copies. Generally, the CRC 32 code is used for generating a CRC (cyclic redundancy check) checksum of str having a length of 32 bits and verifying the integrity of received data.

In FIG. 3, identification codes as eigenvalues are calculated, and the CRC 32 code calculating process is performed by using the values of the identification codes. Although the identification codes of this example are represented as 1 to 8 for easy understanding of a 32-bit image checksum, actually, values aligned to be incremented as above are not necessary.

As illustrated in FIG. 3, in the case where pages are arranged in an incorrect order, the result of the CRC 32 code calculating process has a different value, and it can be checked that there is an abnormality in the order of pages.

According to the description presented above, even in the case where different images are included in copies of units, in the reference copy of a output unit and a copy of a output unit other than the reference copy, it is determined whether or not image formation is normally performed based on the calculating process and the comparison of the image eigenvalues, and, even in the case where the image formation is not normal, the place of the abnormality is stored, and the output may be continued. The place that is determined to be negative is represented in a copy, and pages may be included further.

Figure 4:
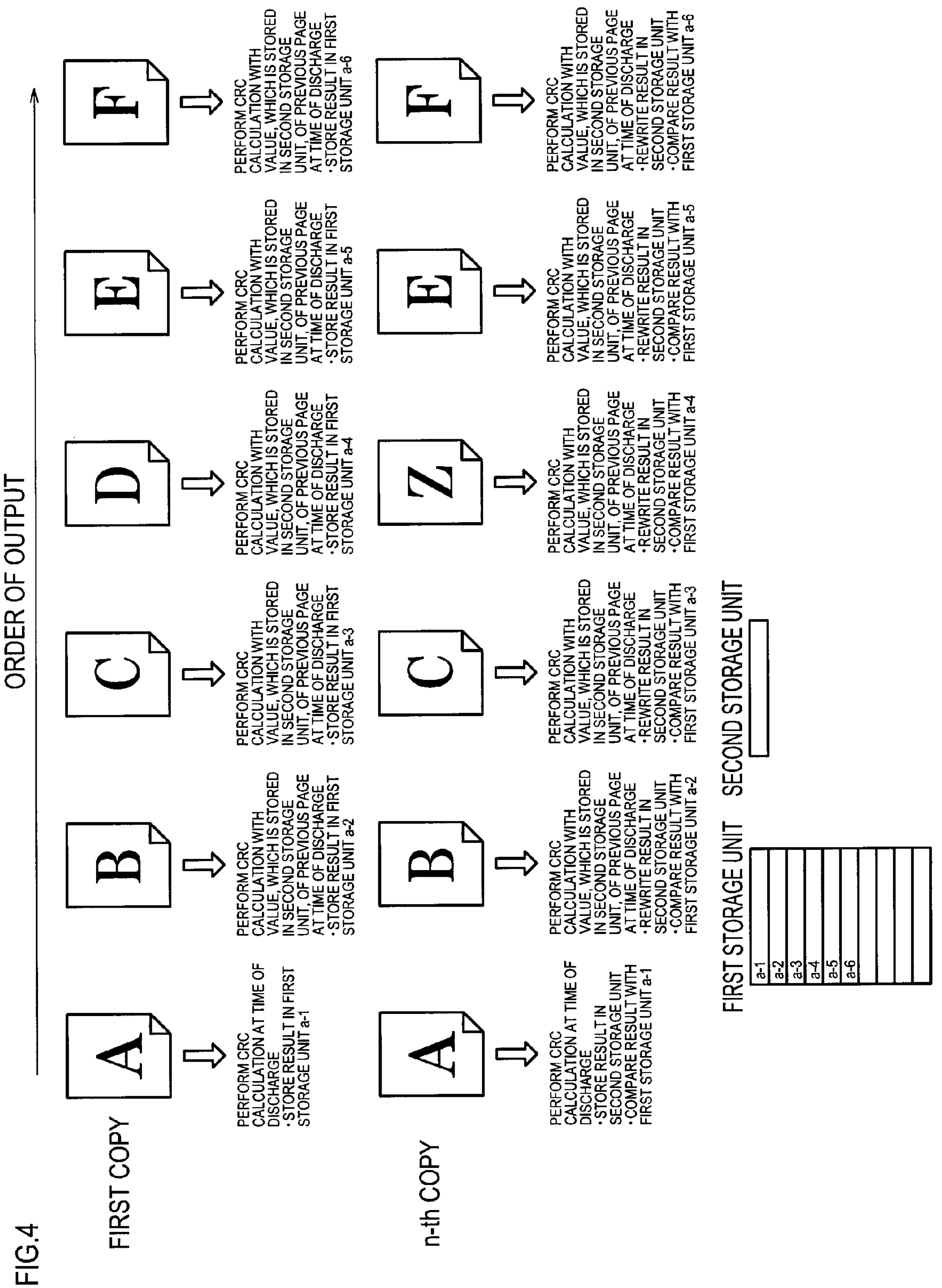
FIG. 4 is a diagram that illustrates an example of a CRC code calculating process in units of pages.

FIG. 4 illustrates an example of the CRC 32 code calculating process when the calculating process is performed in units of pages, and a determination is made in units of pages. In the CRC code calculating process, the CRC calculating process is performed for each discharge in units of pages of each copy, and the result of the calculating process is stored for each page. In this example, a CRC code for the reference data is calculated for the first copy and is stored in the first storage unit for each page. For the n-th copy, a CRC code used for comparison is calculated and is stored in the second storage unit for each page. At that time, the data of the first storage unit and the data of the second storage unit are compared with each other for each page, and, when the sequence number of a copy changes, the result of the CRC code calculating process can be rewritten through overwriting in the second storage unit.

Figure 5:
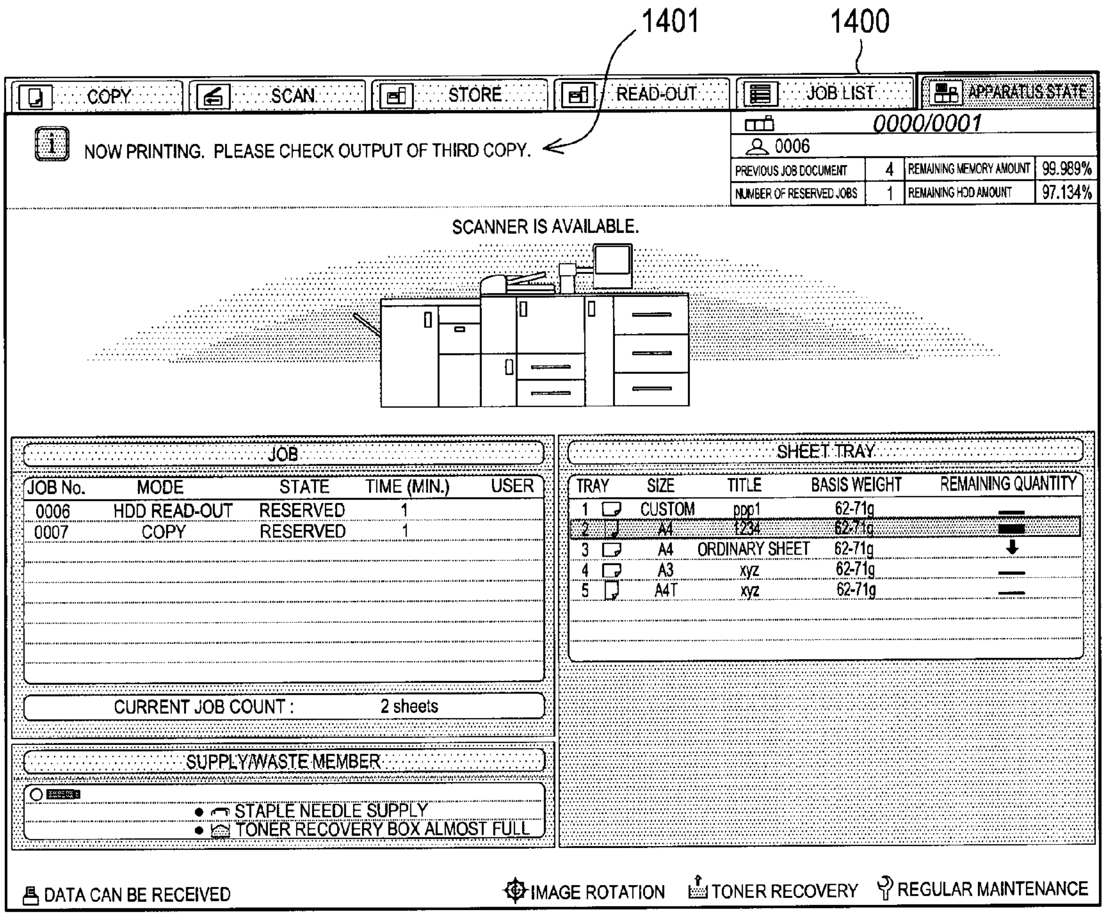
FIG. 5 is a diagram that illustrates an example of a screen displaying a page abnormality in units of copies.

FIG. 5 illustrates a display screen 1400 on which an abnormality notification is displayed on the operation unit 140 in the case where the output is determined not to be normal as a result of a determination on whether the output is a normal output, in other words, in the case where an abnormality is detected.

In notifying of the display screen 1400 of an abnormality, the above-described determination is made in units of copies, and a message for a case where a page disorder occurs is displayed. The display screen 1400 can be displayed on the operation unit 140 or the like. The display screen 1400 includes a message field 1401, an abnormality occurs in the third copy according to the message, and accordingly, an operator is requested to check the abnormality, and it is represented that the output is continued based on the display of "now printing".

Next, the sequence of performing the process while coincidence or non-coincidence of images is determined in units of pages will be described with reference to flowcharts illustrated in FIGS. 6 to 9. The following sequence is performed by the image control CPU 113.

Figure 6:
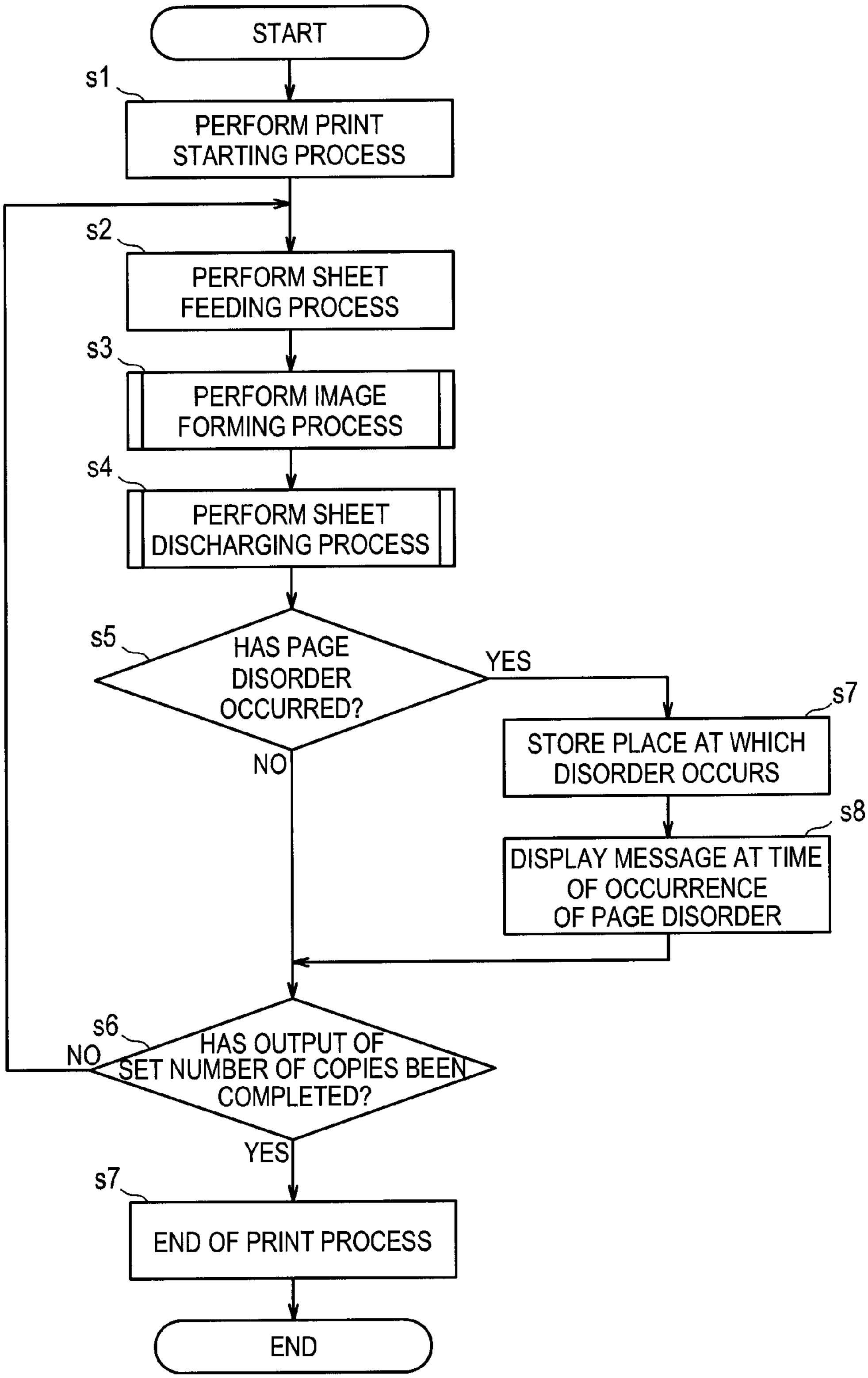
FIG. 6 is a flowchart that illustrates the sequence for determining a page disorder by outputting a plurality of copies of output units.

As illustrated in FIG. 6, first, a print starting process is performed in Step s1. After the print starting process, a sheet feeding-process in Steps s2, an image forming process in Steps s3 and a sheet discharging process in Steps s4 are sequentially performed. In the image forming process, image eigenvalues are calculated as will be described later. In the sheet discharging process, after the final sheet of the copy is discharged, a determination of the coincidence or the non-coincidence of images in units of pages is made. Detailed processes will be described later.

After the sheet discharging process is performed in Step s4, it is determined whether or not an page disorder occurs in Step s5. The page disorder is determined based on whether or not a page disorder state to be described later is set. In the case where a page disorder does not occur (NO in Step s5), it is determined whether or not the output corresponding to the predetermined number of copies has been completed in Step s6, and, in the case where the output corresponding to the predetermined number of copies has not been completed (NO in Step s6), the process is returned to the sheet feeding process of Step s2, and the output is continued. On the other hand, in the case where the output corresponding to the predetermined number of copies has been completed (YES in Step s6), a print completing process is performed in Step s7. In the case where a page disorder occurs in step s5, a place at which the page disorder occurs is stored in the system memory 115 in Step s7, and a message used at the time of the occurrence of the page disorder, as illustrated in FIG. 5, is displayed on the operation unit 140 or the like in Step s8. Subsequently, the process proceeds to Step s6, and it is determined whether or not the output corresponding to the predetermined number of copies has been completed, and, in the case where the output corresponding to the predetermined number of copies has not been completed, the output is continued as described above.

As described above, in the case where the page disorder occurs, the place is stored, the message is displayed, and the output is continued, whereby the page disorder can be easily responded without decreasing the efficiency.

Figure 7:
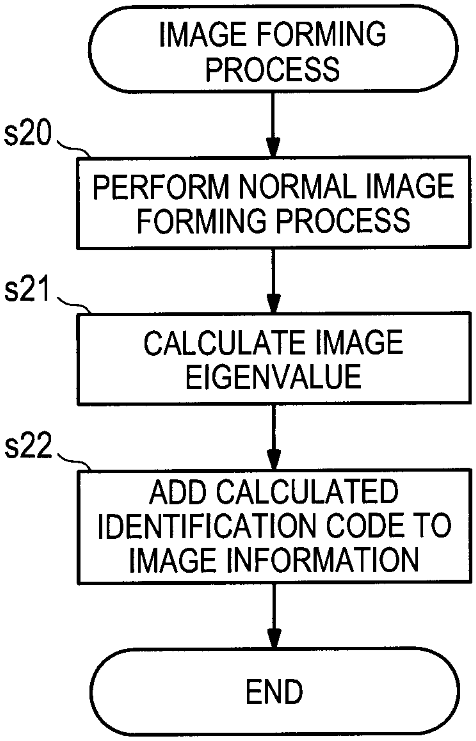
FIG. 7 is a flowchart that illustrates the sequence of an image forming process.

Next, the sequence of the image forming process performed in Step s3 will be described with reference to the flowchart illustrated in FIG. 7.

First, a normal image forming process is performed in Step s20, and a checksum calculation of an image is performed so as to acquire an image eigenvalue (identification code) in Step s21. The calculated identification code is added to the image information in Step s22, and the process ends.

Figure 8:
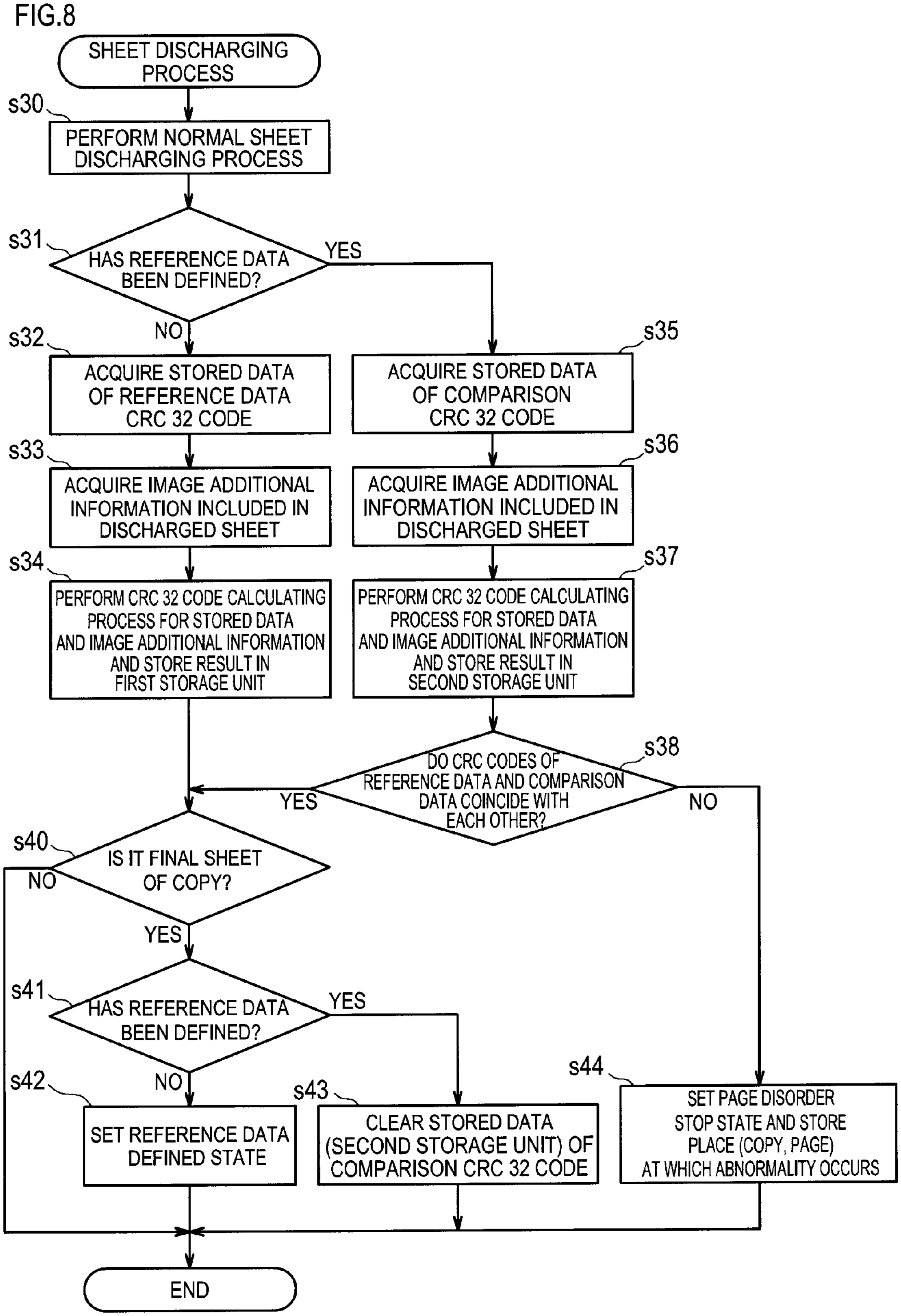
FIG. 8 is a flowchart that illustrates the sequence of a sheet discharging process.

Next, a detailed sequence of the sheet discharging process performed in Step s4 will be described with reference to the flowchart illustrated in FIG. 8.

First, a normal sheet discharging process is performed in Step s30, and it is determined whether or not reference data that is used for image comparison is in a defined state in Step s31.

In the case where the reference data is not in the defined state (NO in Step s31), from the system memory 115 in which the reference data CRC 32 code is stored, the code data is read out so as to be acquired in Step s32. Subsequently, image additional information that relates to a discharged sheet and is included in image information is acquired in Step s33, the CRC 32 code calculating process is performed for the storing data acquired in Step s32 and the image additional information, here, the identification code calculated by the image forming process, and the calculating process result is stored in a predetermined area of the system memory 115 as a first storage unit in Step s34. Subsequently, it is determined whether or not the sheet is the final sheet of the copy in Step s40.

In Step s31, in the case where the reference data is in the defined state (YES in Step s31), from the system memory 115 in which the CRC 32 code for comparison is stored, the code data is read out so as to be acquired in Step s35. Subsequently, the image additional information that relates to the discharged sheet and is included in the image information is acquired in Step s36, the CRC code calculating process is performed for the storing data acquired in Step s35 and the image additional information, here, an identification code that is calculated by the image forming process, and the result of the calculating process is stored in a predetermined area of the system memory 115 as a second storage unit in Step s37.

Subsequently, a CRC code for reference data and a CRC code for comparison are read out from the system memory 115 as the first storage unit and the second storage unit for the discharged sheet, and a determination on the coincidence thereof is made in Step s38. In the case where the codes coincide with each other (YES in Step s38), it is determined whether or not the sheet is the final sheet of the copy in Step s40. As a result of the comparison, in the case where the codes do not coincide with each other (NO in Step s38), a page disorder stop state is set as the occurrence of a page disorder in the page in Step s44, and the process ends.

In the determination on whether or not the discharged sheet is the final sheet of the copy, which is performed in Step s40, in the case where the discharged sheet is not the final sheet of the copy (NO in Step s40), the process ends.

On the other hand, in case where the discharged sheet is the final sheet of the copy (YES in Step s40), it is determined whether or not the reference data is in the defined state in Step s41. In the case where the reference data is not in the defined state (NO in Step s41), the reference data finalization state is set in Step s42, and the process ends. On the other hand, in the case where the reference data is in the defined state (YES in Step s41), data of the CRC 32 code for comparison, which is stored in the system memory 115 as the second storage unit, is cleared in Step s43, and the process ends.

Figure 9:
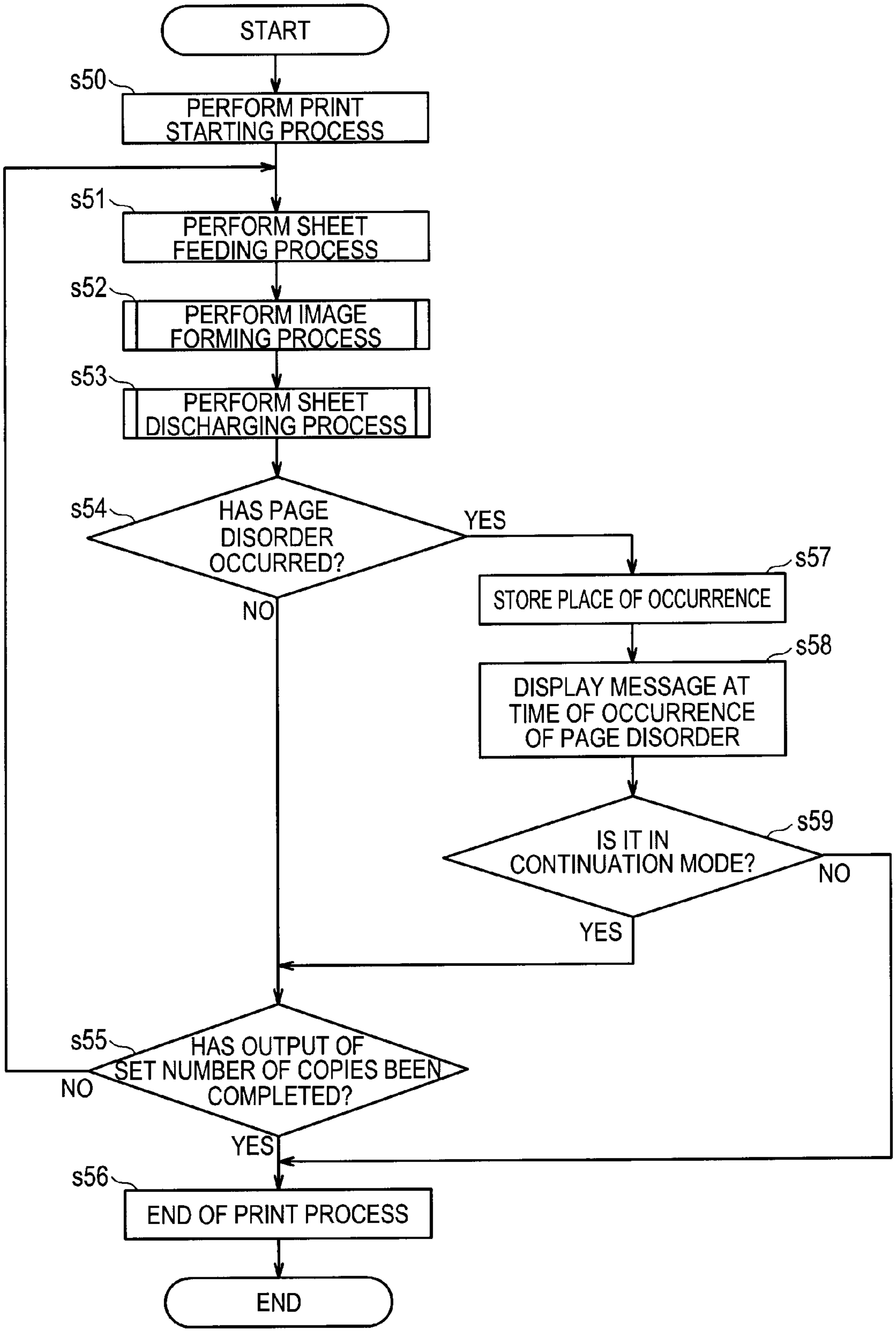
FIG. 9 is a flowchart that illustrates the sequence for determining a page disorder by outputting a plurality of copies of output units and determining whether or not the output process is continued in the case where there is a page disorder.

Next, the sequence for determining whether or not the output is continued when a page disorder is detected through a page disorder detecting process will be described with reference to the flowchart illustrated in FIG. 9. The following sequence is performed under the control of the image control CPU 113.

First, the print starting process is performed in Step s50. After the print starting process, a sheet feeding process in Step s51, an image forming process in Step s52 and a sheet discharging process in Step s53 are sequentially performed. In Steps s50 to s53 described above, the same process as that of Steps s1 to s4 described above is performed. In other words, an image eigenvalue is calculated in the image forming process, the final sheet of the copy is discharged in the sheet discharging process, and then, a determination of the coincidence or the non-coincidence of images in units of pages is made.

After the sheet discharging process is performed in Step s53, it is determined whether or not a page disorder occurs in Step s54. The page disorder is determined based on whether or not the page disorder state to be described later is set. In the case where a page disorder does not occur (NO in Step s54), it is determined whether or not the output corresponding to the predetermined number of copies has been completed in Step s55, and, in the case where the output corresponding to the predetermined number of copies has not been completed (NO in Step s55), the process is returned to the sheet feeding process of Step s51, and the output is continued.

On the other hand, in the case where the output corresponding to the predetermined number of copies has been completed (YES in Step s55), a print completing process is performed in Step s56. In the case where a page disorder occurs in step s54, a place at which the page disorder occurs is stored in the system memory 115 in Step s57, and a message used at the time of the occurrence of the page disorder, as illustrated in FIG. 5, is displayed on the operation unit 140 or the like in Step s58. Subsequently, it is determined whether or not the mode is a continuation mode in accordance with a predetermined condition in Step s59. In the case where the mode corresponds to the continuation mode (YES in Step s59), subsequently, the process proceeds to Step s55, and it is determined whether or not the output corresponding to the predetermined number of copies has been completed, and, in the case where the output corresponding to the predetermined number of copies has not been completed, the output is continued as described above. On the other hand, in the case where mode does not correspond to the continuation mode (NO in Step s59), the process proceeds to the print completing process in Step s56.

Here, although the predetermined condition used for determining whether or not the mode corresponds to the continuation mode is not particularly limited in an embodiment of the present invention, examples thereof are as follows.

1. It is determined whether or not an operator is present within a predetermined distance from the image forming apparatus, in the case where an operator is not present, the continuation mode is determined, and, in the case where an operator is present, the mode is determined not to correspond to the continuation mode. In the detection of an operator, a human body detecting function or the like can be used.

According to the description presented above, the continuation or the stop of the output may be selected based on whether or not an operator is present within the predetermined distance, and, at the time of detecting page missing or page replacement, a decrease in the operating ratio can be suppressed to be minimal even when no operator is present.

For example, in the case where an operator is present within the predetermined distance, an abnormal output can be handled in a relative speedy manner, and accordingly, the output is stopped. On the other hand, in the case where no operator is present within the predetermined distance, the output may be continued instead of stopping the output. In addition, the predetermined distance may be set in advance, and the determination is made based on the setting, or a determination may be made by using a distance that is set by an operator using the operation unit included in the image forming apparatus. Furthermore, the set data relating to the predetermined distance may be configured to be changeable through the operation unit.

It can be determined-whether or not an operator is present within the predetermined distance by using a human body detecting function, and the determination method is not particularly limited in an embodiment of the present invention.

Other example thereof is as follows.

2. It is determined whether or not a predetermined time has elapsed after an operation or the running of the image forming apparatus. In the case where the predetermined time has not elapsed, the continuation mode is determined. On the other hand, in the case where the predetermined time has elapsed, the mode is determined not to correspond to the continuation mode.

As a result of the determination, the case where it is determined that an image has not been normally formed, the continuation or the stop of the output may be selected based on an elapsed time. For example, before the predetermined elapsed time, a sufficient output has not been performed, and accordingly, the output is continued. On the other hand, after the predetermined elapsed time, the output has been performed up to some degree, and accordingly, the output may be stopped. In addition, the elapsed time may be set in advance, and the determination is made based on the setting, or a determination may be made by using a time that is set by an operator using the operation unit included in the image forming apparatus. Furthermore, the set data relating to the elapsed time may be configured to be changeable through the operation unit.

Other example thereof is as follows.

3. The determination is made based on the sequence number of a copy for which a page disorder occurs. In the case where the page disorder occurs before the second copy, the stop mode is determined. On the other hand, in the case where the page disorder occurs at the second copy or after the second copy, the continuation mode is determined.

As a result of the determination, in the case where it is determined that an image has not been normally formed, the continuation or the stop of the output may be selected based on whether or not the abnormality is detected after a predetermined sequence number of copies. For example, in the case where the output has been normally performed up to a predetermined sequence number of copies, the output is continued, and, in the case where an abnormality is detected before a predetermined sequence number of copies (for example, the second copy), the output may be stopped. In addition, the predetermined sequence number of copies may be set in advance, and the determination is made based on the setting, or a determination may be made by using a predetermined sequence number of copies that is set by an operator using the operation unit included in the image forming apparatus. Furthermore, the set data relating to the predetermined sequence number of copies may be configured to be changeable through the operation unit.

Other example thereof is as follows.

4. In the case where it is detected that images have not been normally formed consecutively for a predetermined number of copies, the stop mode is determined, but otherwise, the continuation mode is determined.

In the case where an abnormality consecutively occurs in a copy, there is a high probability of the occurrence of an abnormality thereafter, and the output may be stopped. In addition, the predetermined number of copies may be set in advance, and the determination is made based on the setting, or a determination may be made by using a predetermined number of copies that is set by an operator using the operation unit included in the image forming apparatus. Furthermore, the set data relating to the predetermined number of copies may be configured to be changeable through the operation unit.

In addition, the continuation or the stop of the output may be selected based on whether or not sheets following a copy of a specific sequence number for which an image is determined not to have been normally formed are consecutive for a predetermined number of copies. For example, after a copy of a specific sequence number for which an image is determined not to have been normally formed, for example, in the case where two copies are consecutive or the like, the output is stopped, but otherwise, the output may be continued. Here, the set data relating to a sheet of a predetermined sequence number of copies may be configured to be changeable through the operation unit and may be configured to be changeable together with the predetermined number of copies that are consecutive through the operation unit.

Other example thereof is as follows.

5. The determination is made based on the current time. In the case of daytime, the continuation mode is determined. On the other hand, in the case of time other than daytime, the stop mode is determined.

As a result of the determination, in the case where it is determined that an image has not been normally formed, the continuation or the stop of the output may be selected based on whether or the current time is predetermined time. For example, in the case where an abnormality is detected at daytime, it can be handled by an operator, and thus, the output is continued. On the other hand, in the case where an abnormality is detected at nighttime, there is a possibility that it is difficult for an operator to respond to the abnormality, and the output may be stopped.

As described above, according to an embodiment of the present invention, when a plurality of copies is output in units of copies, page missing and page misplaced due to missing of a page and page replacement can automatically be detected by comparing images with each other in units of copies, and even in the case where an image is not normally formed, the output process can be continued, whereby the efficiency can be improved.

In the above-described examples, whether it is in the continuation mode or not may be determined in accordance with each condition. In addition, it may be configured such that priority levels are arranged in a plurality of conditions, and whether it is in the continuation mode or not is determined.

As above, while the embodiments of the present invention have been described, the present invention is not limited to the content of the above-described embodiments, and an appropriate change can be made therein in the range not departing from the scope of the present invention.

What is claimed is:

1. An image forming apparatus that sets an output unit configured by a plurality of pages of which the order is determined as one copy and outputs a plurality of copies of output units as a JOB, the image forming apparatus comprising:

an image forming unit that sequentially forms images corresponding to the plurality of pages on a plurality of sheets;

a control unit that performs a calculation process of image eigenvalues that are based on the images for each of the output units;

a first storage unit that stores a result of the calculation process performed for a reference copy of the output unit that is a specific one copy out of the plurality of copies of the output units; and a second storage unit that stores a result of the calculation process performed for a copy of output unit other than the reference copy of the output unit out of the plurality of copies of the output units, wherein the control unit determines whether or not images are normally formed on the plurality of sheets for the copy of the output unit other than the reference copy of the output unit based on a result of comparison between the result of the calculation process which is stored in the first storage unit and the result of the calculation process which is stored in the second storage unit and, in the case where a negative determination is made, stores a place determined to be negative, and continues to output the JOB without stop.

2. The image forming apparatus according to claim 1, further comprising a third storage unit that stores the place determined to be negative.

3. The image forming apparatus according to claim 1, further comprising an eigenvalue calculating unit that calculates the image eigenvalues of the images when the images are formed or before the images are formed.

4. The image forming apparatus according to claim 1, wherein the control unit performs the calculation process depending on the order of the image eigenvalues.

5. The image forming apparatus according to claim 1, further comprising:

an image data storing unit that stores data of images corresponding to the plurality of pages, wherein the control unit repeatedly reads out the image data corresponding to the number of copies, which is designated, from the image data storing unit when the plurality of copies is output.

6. The image forming apparatus according to claim 3, further comprising:

a printer controller unit that receives data for an image from the outside and processes the data into image data for printing, wherein the eigenvalue calculating unit calculates the image eigenvalues based on the image data of each page that is transmitted from the printer controller unit.

7. The image forming apparatus according to claim 1, wherein the control unit performs an abnormality notifying process in the case where the negative determination is made through the determination.

8. The image forming apparatus according to claim 7, wherein the control unit notifies the place that is determined to be negative in the abnormal notifying process.

9. The image forming apparatus according to claim 1, wherein the control unit stops the output of the JOB in the case where the negative determinations are consecutive for a predetermined number of copies.

10. The image forming apparatus according to claim 1, wherein, in the case where the negative determination is made through the determination, the control unit determines whether or not the output of the JOB is continued in accordance with a predetermined condition and continues or stops the output of the JOB based on a result of the determination.

11. The image forming apparatus according to claim 10, wherein the predetermined condition is whether or not an operator is detected within a predetermined distance from the image forming apparatus.

12. The image forming apparatus according to claim 10, wherein the predetermined condition is whether or not a predetermined time has elapsed after an operation or running of the image forming apparatus.

13. The image forming apparatus according to claim 10, wherein the predetermined condition is whether or not a sequence number of a copy for which an image is determined to have not normally been formed is a predetermined sequence number of a copy.

14. The image forming apparatus according to claim 10, wherein the predetermined condition is whether or not copies for which an image is determined to have not normally been formed are consecutive for a predetermined number of copies.

15. The image forming apparatus according to claim 10, wherein the predetermined condition is whether or not the current time is a predetermined time.

16. The image forming apparatus according to claim 1 further comprising:

an operation unit that receives an operation input, wherein the control unit is capable of setting the reference copy through the operation unit.

17. An image forming system comprising:

an image forming apparatus that sets an output unit configured by a plurality of pages of which the order is determined as one copy, outputs a plurality of copies of the output units as a JOB, and includes an image forming unit that sequentially forms images corresponding to the plurality of pages on a plurality of sheets;

an external apparatus that is capable of transmitting images corresponding to the plurality of pages of which the order is determined;

a network to which the image forming apparatus and the external apparatus are connected; and an eigenvalue calculating unit that calculates image eigenvalues of the images, wherein the image forming apparatus further includes:

a control unit that performs a calculation process of the image eigenvalues for each of the output units;

a first storage unit that stores a result of the calculation process performed for a reference copy of the output unit that is a specific one copy out of the plurality of copies of the output units; and a second storage unit that stores a result of the calculation process performed for a copy of output unit other than the reference copy of the output unit out of the plurality of copies of the output units, and wherein the control unit determines whether or not images are normally formed on the plurality of sheets for the copy of the output unit other than the reference copy of the output unit based on a result of comparison between the result of the calculation process which is stored in the first storage unit and the result of the calculation process which is stored in the second storage unit and, in the case where a negative determination is made, stores a place determined to be negative, and continues to output the JOB without stop.

18. The image forming system according to claim 17, wherein the eigenvalue calculating unit is included in the external apparatus or the image forming apparatus.

19. A non-transitory computer-readable recording medium in which a program is stored that causes a computer for controlling an image forming apparatus to perform a function of setting an output unit configured by a plurality of pages of which the order is determined as one copy and outputting a plurality of copies of the output units, the program implements:

a function of sequentially forming images corresponding to the plurality of pages on a plurality of sheets;

a function of performing a calculation process of image eigenvalues that are calculated based on the images for each of the output units;

a function of storing a result of the calculation process performed for a reference copy of the output unit that is a specific one copy out of the plurality of copies the output units in a first storage unit;

a function of storing a result of the calculation process performed for a copy of the output unit other than the reference copy of the output unit out of the plurality of copies of the output units in a second storage unit; and a function of determining whether or not images are normally formed on the plurality of sheets for the copy of the output unit other than the reference copy of the output unit based on a result of comparison between the result of the calculation process, which is stored in the first storage unit, and the result of the calculation process, which is stored in the second storage unit and, in the case where a negative determination is made, storing a place determined to be negative, and continues to output the JOB without stop.

20. The non-transitory computer-readable recording medium according to claim 19 in which the program further implementing a function of calculating the image eigenvalues of the images when the images are formed or before the images are formed is stored.

* * * * *

UNITED STATES PATENT AND TRADEMARK OFFICE

CERTIFICATE OF CORRECTION

PATENT NO. : 8,724,124 B2
APPLICATION NO. : 13/552363
DATED : May 13, 2014
INVENTOR(S) : Masaru Ohtsuka et al.

It is certified that error appears in the above-identified patent and that said Letters Patent is hereby corrected as shown below:

On the Title Page, Item (73) Assignee:

change "Konica Minolta Business Technologies, Inc." to --Konica Minolta, Inc.--

Signed and Sealed this
Fourth Day of November, 2014

Michelle K. Lee

Michelle K. Lee
*Deputy Director of the United States Patent and Trademark Office*